United States Patent [19]

Samoto et al.

[11] 4,139,040
[45] Feb. 13, 1979

[54] PNEUMATIC TIRE FOR VEHICLES

[75] Inventors: Masao Samoto, Kunitachi; Kazumi Ueno, Tokorozawa; Kazuhiro Tanaka, Higashi-Murayama, all of Japan

[73] Assignee: Bridgestone Tire Company Limited, Tokyo, Japan

[21] Appl. No.: 787,114

[22] Filed: Apr. 13, 1977

[30] Foreign Application Priority Data

Apr. 18, 1976 [JP] Japan .................................. 51-47730

[51] Int. Cl.² ............................................ B60C 15/06
[52] U.S. Cl. ........................... 152/362 R; 152/353 R; 152/354 R
[58] Field of Search ......... 152/362 R, 362 CS, 353 R, 152/330 RF, 354 R

[56] References Cited

U.S. PATENT DOCUMENTS

| 3,392,773 | 7/1968 | Warren et al. | 152/362 R X |
| 3,612,138 | 10/1971 | Ravenhall | 152/362 R |
| 3,722,568 | 3/1973 | Maiocchi | 152/362 CS X |
| 4,023,608 | 5/1977 | Meiss | 152/362 R |

FOREIGN PATENT DOCUMENTS 1000113  8/1965  United Kingdom ................ 152/362 R Primary Examiner—Francis S. Husar
Assistant Examiner—Randolph A. Reese
Attorney, Agent, or Firm—Sughrue, Rothwell, Mion, Zinn and Macpeak

[57] ABSTRACT

A pneumatic tire for vehicles comprising a main carcass body and an improved bead portion construction is disclosed. The bead portion comprises two bead wires and the remainder of the main carcass body having two ends wound around the two bead wires from the inside toward the outside thereof to form a turn-up portion. The turn-up portion is substantially closely disposed adjacent to the main carcass body and extended upwardly along the side surface of the main carcass body.

7 Claims, 5 Drawing Figures

FIG._1
PRIOR ART
FIG._2
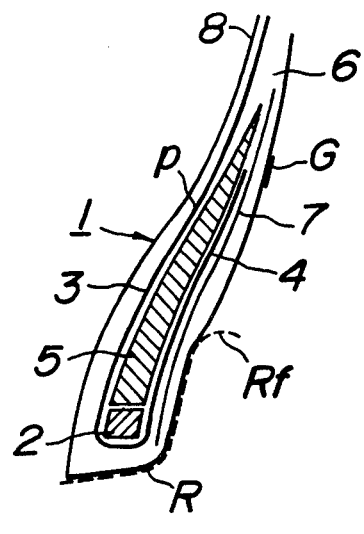
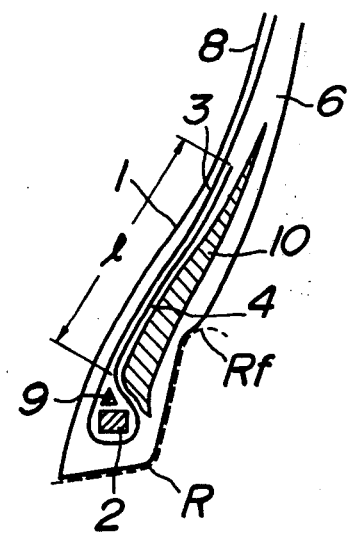
FIG._3
FIG._4
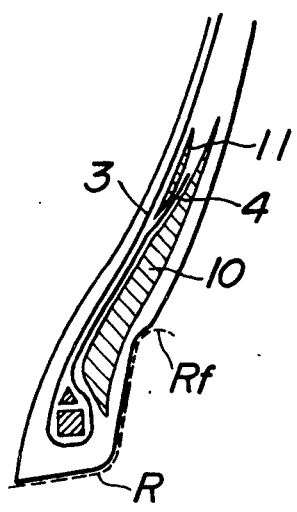
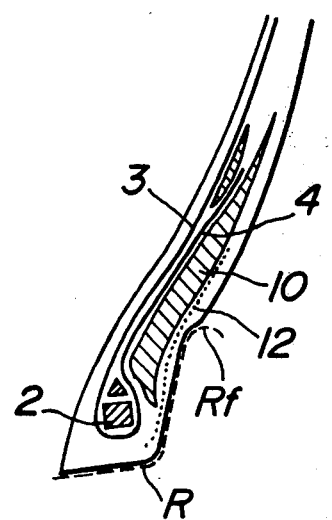

PNEUMATIC TIRE FOR VEHICLES

This invention relates to a pneumatic tire for vehicles comprising a main carcass body composed of a few carcass plies as in the case of a radial tire and an improved bead portion construction.

A radial tire comprises a main carcass body composed of at most 3 rubberized reinforcing layers each formed of cords arranged in a direction substantially perpendicular to the equatorial line of the tire. Both ends of these reinforcing layers are wound around two bead wires from the inside toward the outside thereof to form two turn-up portions secured to the bead portion.

Heretofore, it has been the common practice to separate the turn-up portion from the main carcass body to form a given space in which is inserted a hard rubber filler extending from the upper surface of the bead wire and cushioning external force subjected to the bead portion so as to make the bead portion as a whole rigid and durable.

When the tire is running, the reinforcing cords of the carcass are subjected to tension by the internal pressure applied into the tire. As a result, the turn-up portion tends to be always pulled toward the bead wire. The upper end of the turn-up portion at which the number of cords of the reinforcing layer is changed is deformed due to the load produced when the tire is rotated. In addition, the turn-up portion and particularly its upper end is liable to be subjected to excessively large concentrated stress due to irregular deformations, etc. produced when the external force acts in a direction parallel with the ground surface, thereby inducing a separation failure.

In order to obviate such concentration of stress, attempts have been made to cover the upper end of the turnup portion with an auxiliary cord layer or to extend the turn-up portion upwardly to the sidewall. But, none has led to fully satisfactory results with respect to strong bending movement of the bead portion about the upper end of a rim flange, thereby significantly impairing comfortable riding characteristics of the radial tire.

An object of the invention, therefore, is to provide a pneumatic tire for vehicles comprising a bead portion which is so constructed that the turn-up portion of the carcass and particularly the upper end thereof is not subjected to concentrated stress, that the tire has a high durability and that the tire can be manufactured in a less expensive manner.

A feature of the invention is the provision of a pneumatic tire for vehicles comprising a toroidal-shaped main carcass body composed of a rubberized cord layer containing ply cords embedded therein and arranged in the radial direction of the tire, and bead portions composed of a bead wire, respectively, and the remainder of the main carcass body having two ends wound around the bead wires from the inside toward the outside thereof to form a turn-up portion embedded in tire rubber, the turn-up portion being substantially closely disposed adjacent to the main carcass body at that compression region of the bead portion which corresponds to a rim flange position and having a region extending along the side surface of the main carcass body.

The invention will now be described in greater detail with reference to the accompanying drawings, wherein:

FIG. 1 is a transverse cross sectional view showing a bead portion of a conventional radial tire;

FIGS. 2, 3 and 4 are transverse cross sectional views, illustrating different embodiments of a bead portion of a radial tire according to the invention.

Figure 5:
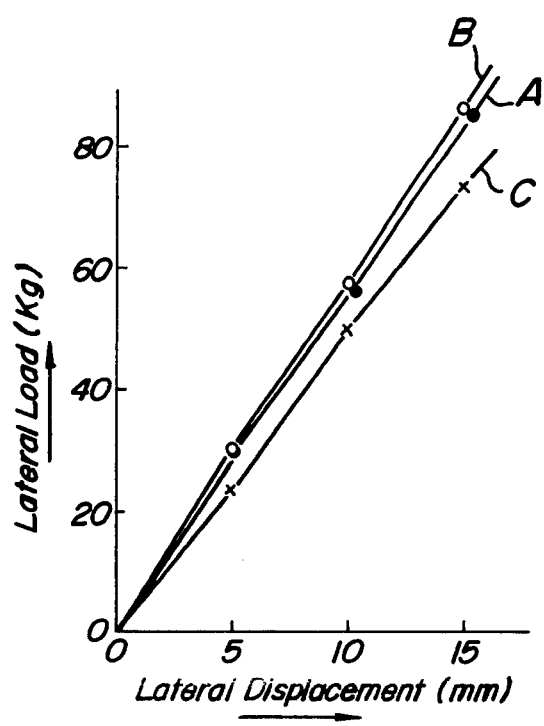
FIG. 5 is a graph illustrating improved effect of lateral rigidity of bead portions of radial tires according to the invention as compared with that of a bead portion of a conventional radial tire.

Referring to FIG. 1 showing a bead portion of a conventional radial tire, reference numeral 1 designates a bead portion. In the bead portion 1, the remainder of a carcass ply P of a main carcass body 3 is wound around a bead wire 2 composed of a plurality of steel wire bundles from the inside toward the outside thereof to form a turn-up portion 4 having a given length. The turn-up portion 4 is separated from a main carcass body 3 to form a given space into which is inserted a thin wedge-shaped hard rubber filler 5 with its base portion disposed on the upper surface of the bead wire 2 and extended upwardly therefrom. The hard rubber filler 5 functions to cushion the external force subjected to the bead portion 1 and makes the bead portion 1 as a whole rigid.

When the tire is running, the reinforcing cords embedded in the main carcass body 3 are subjected to tension due to the internal pressure applied into the tire, so that the turn-up portion 4 tends to be always pulled toward the bead wire. The upper end of the turn-up portion 4 is that portion of the main carcass body 3 where the number of the reinforcing cords embedded therein becomes changed. Deformation of the tire due to the load subjected to it every time the tire is rotated, irregular deformation of the tire due to the external force acting in the horizontal direction in parallel with the ground surface and the like cause the turn-up portion 4 and particularly the upper end thereof to be subjected to concentrated stress, thereby inducing a separation failure of the tire.

In order to eliminate the difficult problem which has been encountered with the above mentioned stress concentration, attempts have been made to cover the upper end of the turn-up portion 4 with an auxiliary cord layer 7 or to upwardly extend the turn-up portion 4 up to a sidewall portion, but hitherto none has led to fully satisfactory results with respect to strong bending movements of the bead portion 1 occurring around the upper end of a rim flange Rf shown by dotted lines, thereby significantly impairing comfortable riding characteristic of the radial tire.

In order to eliminate this difficult problem which has been encountered with the above mentioned conventional techniques, the invention provides an improved bead portion construction.

In FIG. 2 is shown a right side half of two tire bead portions. It is a matter of course that the two tire bead portions are symmetrically arranged with respect to the equatorial line of the tire. In accordance with the invention, the remainder of a main carcass body 3 is wound around a bead wire 2 from the inside toward the outside thereof to form a turn-up portion 4. The turn-up portion 4 is closely disposed to the main carcass body 3 through a coating rubber of the latter and extended from a position immediately above the bead wire 2 along the side surface of the main carcass body 3.

In the present embodiment, reference numeral 9 designates a rubber stock which is triangular in section and formed of an insulation rubber coated on the steel wires used as the bead wire 2. The insulation rubber 9 is slightly movable and accumulated in a space surrounded by a cord layer of the main carcass body 3, a cord layer of the turn-up portion 4 and the bead wire 2 and filled up therein when the tire is vulcanized and shaped. As a result, the rubber stock 9 is entirely different from the rubber filler 5 shown in FIG. 1. When the tire is united with a rim R as shown by dotted lines in FIG. 2 and inflated by applying an internal pressure therein, that portion of the tire which is located between the rim R and the rim flange Rf is subjected to compression. In addition, the bead portion 1 is deformed by bending due to the external force subjected thereto when the tire is running. In this case, the main carcass body 3 and the turn-up portion 4 of the carcass ply are required to be closely disposed adjacent with each other and extended in parallel with each other for a range having a given length l. As far as the above requirement is satisfied, a small amount of rubber filler may intentionally be arranged above the bead wire 2.

The range of the length l in which the main carcass body 3 and the turn-up portion 4 are closely disposed adjacent with each other is dependent on the internal pressure applied to the tire. In general, however, the main carcass body 3 and the turn-up portion 4 are required to be closely disposed adjacent with each other and extended in parallel with each other for at least 5 mm.

In the present embodiment, outside the turn-up portion 4 is arranged a hard rubber stock 10 so as to make that region of the bead portion 1 which is located above the base portion thereof rigid. The hard rubber stock 10 has a Shore A hardness of at least 55°, preferably a range between 65° and 95°.

A height of the hard rubber stock 10 relative to the height of the turn-up portion 4 may be so determined such that the upper end of the hard rubber stock 10 is extended beyond the upper end of the turn-up portion 4. Alternatively, the hard rubber stock 10 may be arranged at the base portion of the bead portion 1 only. In addition, use may be made of a plurality of rubber stocks whose rubber compounds are different from each other.

In FIG. 3 is shown a modified construction of the bead portion of the radial tire according to the invention. In the present embodiment, between the main carcass body 3 and the turn-up portion 4 at the upper part of the latter is inserted a cushion rubber layer 11.

The cushion rubber layer 11 is arranged for the purpose of absorbing shearing strain to be subjected to that portion of the bead portion 1 which is located between the main carcass body 3 and the turn-up portion 4 due to external force subjected thereto. In order to attain such purpose, it is preferable that the soft cushion rubber layer 11 is formed of a rubber compound having a hardness which is equal to or slightly smaller than that of the coating rubber of the main carcass body 3.

In FIG. 4 is shown another modified construction of the bead portion of the radial tire according to the invention.

In the present embodiment, provision is made of a cord layer 12 acting as a reinforcing layer together with the rubber stock 10 so as to further improve the rigidity of the bead portion 1. In the present embodiment, the reinforcing cord layer 12 is superimposed outside the rubber stock 10. Alternatively, the reinforcing cord layer 12 may be arranged adjacent to the turn-up portion 4 or embedded in the rubber stock 10. Such arrangement of the reinforcing cord layer 12 in its lengthwise direction with respect to the turn-up portion 4 and the rubber stock 10 may suitably be selected dependent on the purpose of the tire. In addition, the number of the reinforcing cord layers 12, inclined angle and material of cord thereof, etc. may suitably be selected dependent on the purpose of the tire.

In order to ascertain the reinforcing effect of the bead portion constructed as above described according to the invention, strains produced on the outer surface of the tire when it is inflated by applying an internal pressure therein at the upper end of the turn-up portion 4 of the main carcass body 3 and at upper and lower positions each distant apart from the upper end of the turn-up portion 4 were measured by means of a strain gauge G shown in FIG. 1. The results thus measured as compared with those of the conventional bead portion are shown in the following Table 1.

Table 1

| Position | Kind of tire A | B | C |
|---|---|---|---|
| 10 mm above upper end of turn-up portion | +2.4% | +2.5% | +3.5% |
| Upper end of turn-up portion | +3.0% | +3.1% | +5.0% |
| 10 mm below upper end of turn-up portion | +2.5% | +2.8% | +3.9% |

The tire tested has a size of 165 SR 13 and comprises a main carcass body 3 composed of 1 ply containing a polyester cord layer arranged in radial direction and a belt layer composed of 2 plies each formed of a steel cord layer. In the above Table 1, A is a tire constructed as above described with reference to FIG. 2, B is a tire constructed as above described with reference to FIG. 3 and C is a conventional tire comprising a reinforcing cord layer 7 shown in FIG. 1. In all of these three tires A, B and C, the length of the turn-up portion 4 measured from the lower end of the bead wire is 35 mm.

As can be seen from the Table 1, the strain produced on each of the tires A, B according to the invention is smaller than that produced on the conventional tire C. In addition, the strain produced on the upper end of the turn-up portion 4 of the main carcass body 3 of the tires A, B according to the invention is not so much changed from that produced at positions 10 mm above and below the upper end of the turn-up portion 4 of the main carcass body 3. The above facts show that the bead portion 1 constructed according to the invention has the advantage that since the turn-up portion 4 of the main carcass body 3 is closely disposed adjacent to the main carcass body 3, the upper end of the turn-up portion is prevented from being subjected to excessively strong concentrated strain.

The above mentioned three kinds of tires A, B and C were mounted on vehicles which are subjected to a number of dead weights and run under heavy load. The tires run under the same conditions until the tread becomes completely worn. Then, the upper end of the turn-up portion 4 of the main carcass body 3 was cut out so as to investigate a separation failure thereof. The tires A, B according to the invention revealed no separation failure, while the conventional tire revealed a separation failure discontinuously induced along the circumferential direction of the tire.

The above mentioned tests were made on tires whose lengths of the turn-up portion measured from the lower ends of the bead wires are 25 mm and 45 mm, respectively. The experimental tests have demonstrated that, in the conventional tire, the shorter the length of the turn-up portion 4 is the larger the separation failure is induced and that the tires according to the invention having the turn-up portions which are 25 mm and 45 mm in length have excellent rigidity. Experimental tests have shown that a length l of a region where the turn-up portion 4 is closely disposed adjacent to the main carcass body 3 of at least 5 mm is effective.

In the bead portion constructed as above described according to the invention, the region where the turn-up portion 4 is closely disposed adjacent to the main carcass body 3 dynamically functions in an effective manner. As a result, lateral rigidity which is important characteristic for exhibiting the cornering of the tire is improved.

In FIG. 5 is shown a graph illustrating lateral rigidity of the above mentioned three kinds of tires A, B and C as measured as function of lateral displacement.

The lateral rigidity was measured as follows. The tires A, B and C were inflated by applying an internal pressure of 1.7 kg/cm$^2$ into these tires and then urged against and secured to a carriage having a sawtooth-like antiskid surface under a vertical load of 320 kg. Then, the carriage is pulled in lateral direction with respect to these tires and the lateral load subjected to these tires as function of the amount of movement of the carriage, i.e. lateral displacement was measured.

As can be seen from FIG. 5, when the lateral displacement taken on abscissa is 15 mm, the lateral load taken on ordinate is 73 kg for the conventional tire C, 84.5 kg for the tire A according to the invention and 86 kg for the tire B according to the invention. The above test results demonstrate that the lateral rigidity of the tires A and B according to the invention is improved by approximately 16% as compared with that of the conventional tire C.

In the case of manufacturing the tire according to the invention, prior to turning-up of the main carcass body 3 around the bead wire 2 on a shaping machine, it is possible to omit a step of inserting the rubber filler 5 as a single member adjacent to the upper surface of the bead wire 2. If the rubber stock 10 is bonded beforehand to both end portions of the main carcass body 3, it is possible to arrange the rubber stock 10 at a given position in the case of turning up the main carcass body 3 around the bead wire 2. As a result, it is possible to omit one manually operating step.

In the above mentioned embodiments, the invention has been applied to the radial tire, the improved effect according to the invention may also be exhibited with respect to any other types of tires which make use of smaller number of carcass plies.

As stated hereinbefore, the bead portion of the tire according to the invention can improve the rigidity of the bead portion without particularly further extending upwardly the turn-up portion of the main carcass body 3, thereby sufficiently improving the durability of the bead portion.

What is claimed is:

1. A pneumatic tire for vehicles comprising a toroidal-shaped main carcass body composed of at least one rubberized cord layer containing ply cords embedded therein and arranged in the radial direction of the tire, and bead portions formed in regions corresponding to ends of the main carcass body, each bead portion having a bead wire and each end of the cord layer of said main carcass body being wound around said bead wire from the inside toward the outside thereof to form a turn-up portion and a hard rubber stock positioned on the outer side of said turn-up portion and arranged entirely outside the region between said turn-up portion and said main carcass body, said turn-up portion being closely disposed adjacent to said main carcass body in the region of said bead portion which faces a rim flange when the tire is mounted on a rim and extending upwardly from substantially the top portion of said bead wire to a position beyond the top of the rim flange.

2. A pneumatic tire for vehicles as claimed in claim 1, wherein said turn-up portion of said main carcass body is substantially closely disposed adjacent to said main carcass body within a length of at least 5 mm.

3. A pneumatic tire for vehicles as claimed in claim 1, wherein said hard rubber stock has a Shore A hardness of at least 55°.

4. A pneumatic tire for vehicles as claimed in claim 3, wherein the upper end of said hard rubber stock is disposed at a position which is located beyond the upper end of said turn-up portion of said main carcass body.

5. A pneumatic tire for vehicles as claimed in claim 3, wherein at least one cord layer is arranged along said turn-up portion of said main carcass body so as to reinforce said bead portion.

6. A pneumatic tire for vehicles as claimed in claim 3, wherein said Shore A hardness of said hard rubber stock is within the range of 65° to 95°.

7. A pneumatic tire for vehicles as claimed in claim 1, wherein a cushion rubber layer is arranged between the upper end of said turn-up portion of said main carcass body and said main carcass body.

* * * * *